Feb. 3, 1942.  N. H. BRUNDIN ET AL  2,271,893
APPARATUS FOR FACILITATING THE PERFORMANCE OF
SERIES OF SPECTRUM ANALYSES
Filed July 5, 1940    3 Sheets-Sheet 2
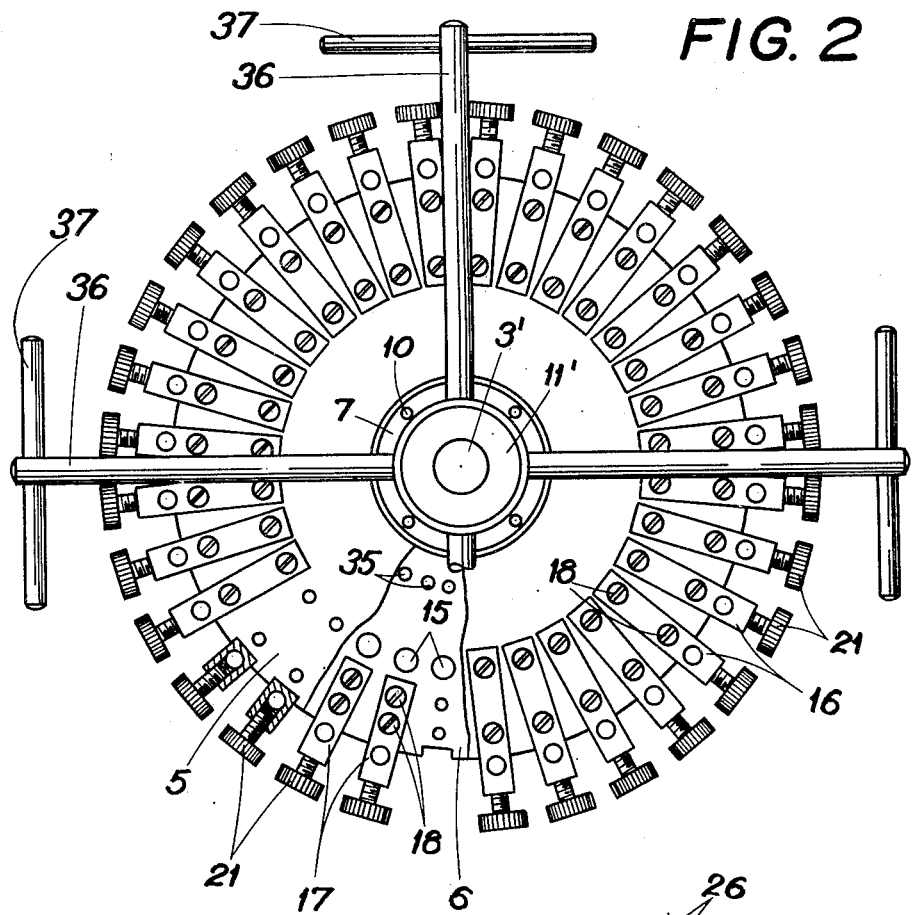
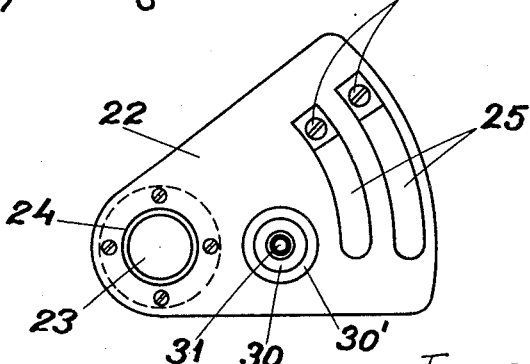
Inventors:
N. H. Brundin and
S. Palmquist
By Young, Emery & Thompson
Attorneys Feb. 3, 1942.   N. H. BRUNDIN ET AL   2,271,893
APPARATUS FOR FACILITATING THE PERFORMANCE OF
SERIES OF SPECTRUM ANALYSES
Filed July 5, 1940   3 Sheets-Sheet 3
FIG. 4
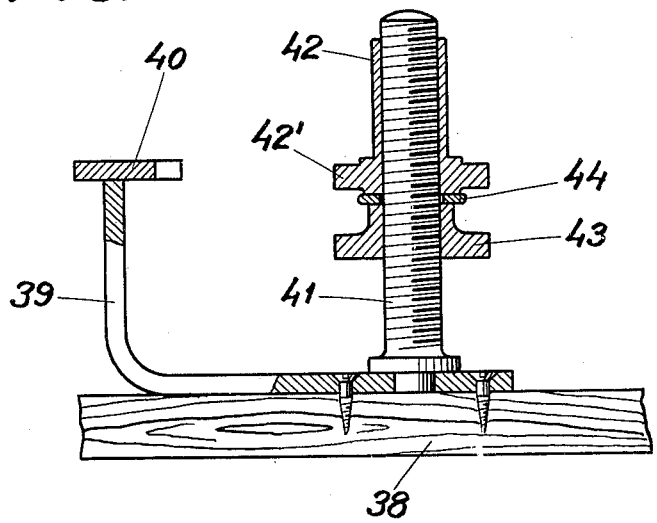
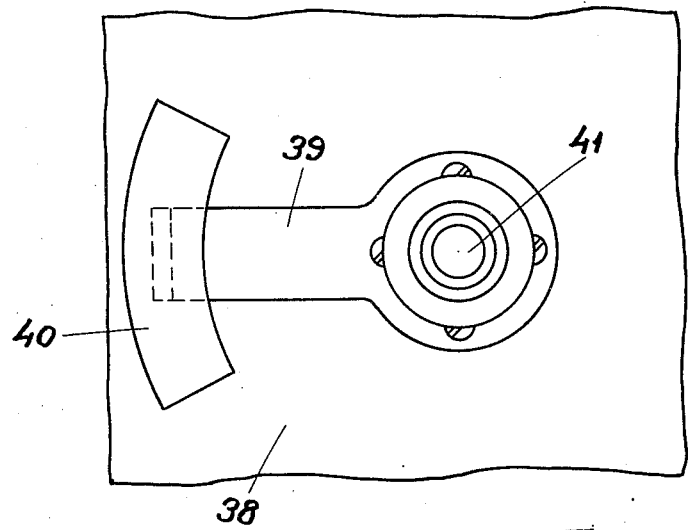
FIG. 5
Inventors:
N. H. Brundin and
S. Palmquist
By Young, Emery + Thompson
Attorneys Patented Feb. 3, 1942

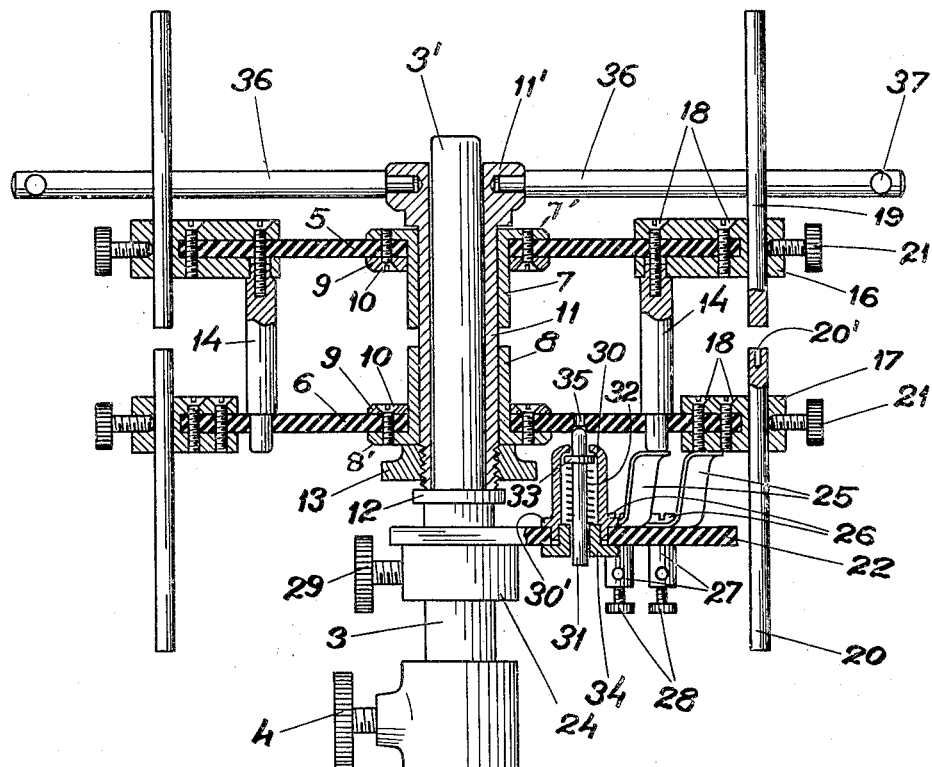
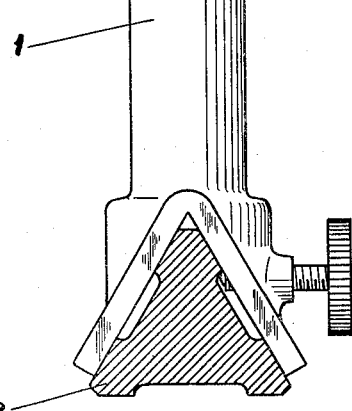
FIG.1

2,271,893

UNITED STATES PATENT OFFICE 2,271,893

APPARATUS FOR FACILITATING THE PERFORMANCE OF SERIES OF SPECTRUM ANALYSES

Nils Herman Brundin and Sven Palmqvist, Lund, Sweden, assignors to Svenska Prospekterings Aktiebolaget, Stockholm, Sweden, a corporation of Sweden Application July 5, 1940, Serial No. 344,182
In Sweden July 1, 1939

11 Claims. (Cl. 176—41)

In spectrum analysis by means of an arc drawn between carbon electrodes, the method has usually been as follows. The cathode carbon which contains the substance to be analysed in a boring and the anode carbon are each inserted and fixed by a screw in a carrier. As it is of importance to the accuracy of the analysis that a constant distance is always maintained between the carbons and that their positions in relation to the slit of the spectrograph is fixed, a fine adjustment must take place which is carried out by means of a light source situated behind the carbons. The rays from this light source are caused to pass a lens, and the shadow of the carbons is adjusted to the desired position in the slit by means of an adjusting means for the carbon carriers. Then the arc is drawn by moving the carbons together until they contact each other, whereupon the carbons are again separated until the desired position has been obtained. Finally, the exposure takes place in the spectrograph for a predetermined number of seconds. At each analysis the anode as well as the cathode carbon must be replaced and a new adjustment carried out. For this reason each analysis takes quite a substantial time which must be considerably reduced if a great number of analyses are to be made in a day.

The object of the present invention is to provide an apparatus which permits carrying out a whole series of spectrum analyses in a sequence without any replacements of carbons, or even any adjustments of the carbons in relation to each other, having to be made between the individual exposures in each series of analyses. Thereby a substantial saving of time is gained.

It is a further object of the invention to provide an apparatus of the kind stated in which the distance between the anode and cathode electrodes or carbons, i. e. the air gap, is constant for all pairs of electrodes, whereby a greater accuracy of the analyses is obtained than when adjusting the electrodes individually before each exposure.

Other objects of the invention will be apparent as the description of the same proceeds.

The invention will be more particularly described with reference to the accompanying drawings which, by way of example, show a preferred form of the same. In the drawings—

Figure 1 is a vertical axial section through the apparatus;

Figure 2 is a plan view of the apparatus;

Figure 3 is a plan view of a detail;

Figure 4 is a vertical section through an auxiliary means for setting the carbon electrodes in predetermined positions; and Figure 5 is a plan view of said auxiliary means.

The apparatus shown in Figures 1 and 2 consists of a base 1 which is slidably mounted on an optical bench 2 of any desired or suitable shape on which the spectrograph (not shown) is also mounted. At the upper end of the base a support 3 in the form of a vertical rod is slidably mounted in an axial boring in the base and may be fixed in any desired position by means of a screw 4. The upper portion of the support or rod 3 is of reduced diameter and forms a journal 3' for a revolving support on which the carbon electrodes are circumferentially mounted. Said revolving support comprises two vertically spaced horizontal disk members 5 and 6 of insulating material, such as a material produced by impregnating canvas with Bakelite powder and then molding the Bakelite under heat and pressure in the usual manner, so that a rigid composite structure is obtained, which are centrally apertured and each rigidly mounted on a central bushing 7 or 8, respectively, having a radial integral flange $7^1$ or $8^1$ respectively at one end to serve as an abutment for the disk 5 or 6. The disks are fastened to the flanges by clamping rings 9 and screws 10 as shown in Figure 1. The bushings 7 and 8 are mounted on a bearing sleeve 11 on which they have a relatively tight fit but may be axially and rotatably displaced for adjustment purposes. The bearing sleeve 11, which is rotatably mounted on the journal 3' and rests on a radial collar 12 on the rod 3, is formed with an enlarged portion 11' at its upper end which serves as an abutment for the upper bushing 7 carrying the disk 5. The lower end of the bearing sleeve is provided with a thread on which a nut 13 is screwed. Said nut 13 engages the lower bushing 8 carrying the disk 6. The disks 5 and 6 are spaced a predetermined distance apart by shouldered bolts 14 which are provided in a circular ring between the disks and engage in apertures 15 provided in the lower disk 6 and in borings made on the underside of electrode carriers which are mounted on the upper disk 5. The disks are kept together by means of the nut 13, which is tightened so as to maintain the disks rigidly connected. The lower ends of the bolts 14 project on the underside of the disk 6 for a purpose to be described later.

Equidistantly spaced carriers 16 and 17 for carbon rods or electrodes are secured by means of screws 18 around the edge of the disks 5 and 6, respectively. Said carriers 16 and 17 consist preferably of metal blocks which are provided with a radial notch engaging over the edge of the disk 5 or 6 and with a vertical bore through which a carbon electrode 19 or 20 may be passed. A set-screw 21 is provided in a threaded radial hole in each carrier and is adapted to fix the carbon in any desired position in said bore. The carriers 16 on the upper disk 5 are of greater radial length than the carriers 17 on the lower disk 6 and near their inner end provided with the abovementioned borings on the underside for location of the spacing bolts 14, while the carriers 17 due to their shorter length do not interfere with said bolts. One of the fixing screws 18 of each carrier 16 passes down into the upper end of the bolt 14, whereby the latter is rigidly connected with the carrier.

The electrode carriers 16 on the upper disk 5 are arranged opposite the electrode carriers 17 on the lower disk 6, when the disks are rigidly connected by means of the bolts 14 and the nut 13. The associated carbon rods or electrodes are accordingly situated axially above each other forming pairs of electrodes. In the apparatus shown the number of such pairs of electrodes is thirtytwo spaced around the whole periphery of the revolving support. The supply of current to the electrodes is effected by means of a contact bridge 22 comprising a sector plate (Figure 3) of insulating material, similar to that of discs 5 and 6, and having an aperture 23 by which the sector plate is fitted on a shouldered metal bush 24 for mounting the same on the rod 3 as shown in Figure 1. On the top side of the sector plate 22 two leaf springs 25 are fastened at one of their ends on the same radial line by screws 26 as indicated in Figure 3. Said springs are of arcuate form as seen in plan view with their common centre of curvature with the centre of the aperture 23 or the axis of the rod 3. From their points of attachment the springs 25 are bent upwardly in the form of an S, and their free ends are adapted to engage the underside of the electrode carriers 17 and the lower end of the spacing bolts 14, respectively. The attaching screws 26 extend through the sector plate and are screwed into two metal blocks 27 provided on the underside of the sector plate, said metal blocks forming terminals to which current supply leads are connected in the usual manner by means of terminal screws 28. At the rotation of the revolving aggregate the leaf springs 25 will make contact with only one electrode carrier 17 and spacing bolt 14 at a time, so that only the associated pair of carbon electrodes 19 and 20 can be supplied with current. The contact bridge can be adjusted vertically as well as angularly on the rod 3 and is secured in the appropriate position by means of a setting screw 29. The angular position of the contact bridge is to be chosen so that the pairs of electrodes are supplied with current when they are successively brought into the correct position of exposure in front of the slit of the spectrograph.

The contact bridge further carries a resilient catch means for holding the revolving support in definite positions in which the leaf springs are in contact with the electrode carriers 17 and the bolts 14, so that the revolving support can be moved from said positions only by the application of a positive force on the same. Said catch means comprises a vertical socket 30 which is mounted on the top side of the sector plate 22 in a boring made therein. The socket 30 is secured to the sector plate by means of screws through a circumferential flange 30' engaging the plate around the edge of said boring. A slidable bolt 31 is mounted within the socket, its upper end projecting upwardly through an opening in the top of the socket, and a helical spring 32 is provided around the bolt 31 the upper end of the same engaging a collar 33 formed on the bolt and the lower end engaging a nut 34 which is screwed into the lower open end of the socket and which also serves as a guide for the bolt 31. The spring 32 tends to force the bolt 31 upwardly in engagement with one of a series of depressions or borings 35 provided in a circle in the lower disk 6 of the revolving support on the same radial lines as the apertures 15 and carriers 17. The top end of the bolt is rounded off so that, upon a rotation of the revolving support due to an exterior positive force, the bolt is pressed down against the action of the spring 32, the function of such a catch means being well-known.

The revolving support is provided with a manipulating means comprising four radial arms 36 which are mounted in the enlarged portion 11' of the bearing sleeve 11 in the form of a cross. Each arm 36 is provided with a transverse rod 37 forming a handle.

In order to ensure that all the pairs of electrode carbons 19 and 20 on the revolving support will be arranged in identically the same manner, i. e. the distance or air gap between the electrode points will be equal for all the pairs of electrodes, an auxiliary setting means shown in Figures 4 and 5 is preferably used. Said auxiliary means comprises a base 38 on which a bracket 39 is mounted which has a bent-up portion formed with a plane horizontal element 40. This abutment is of arcuate form as seen in Figure 5 having its centre of curvature on a vertical line which forms the axis of a threaded journal 41 mounted in the foot portion of the bracket. On this journal a guiding sleeve 42 is slidably mounted which is held in the desired position on the journal by a nut 43 screwed on the latter and a washer 44. The guiding sleeve 42 is of the same outer diameter as the bearing sleeve 11 of the revolver, so that each of the revolving disks 5 and 6 may be fitted on the same, and has an integral flange 42' at its lower end on which the bushings 7 and 8 are intended to rest. After mounting one of the disks 5 and 6 on the journal 41 the carbon rods 19 or 20, respectively, are inserted in the carriers 16 or 17 and brought to rest with one end on the abutment 40, whereupon the carbons are fixed by means of the screws 21. The guiding sleeve 42 is to be so adjusted in relation to the abutment that the ends of the carbons in each pair will be spaced apart a suitable predetermined distance, forming an air gap when the disks are assembled on the bearing sleeve 11. It will be understood that the lower disk 6 of the revolver must be applied top down on the journal 41. It will also be understood that the distance or air gap between the carbons of each pair will be equal around the whole periphery of the revolver.

When using the apparatus described for analysing chemical and mineralogical substances, a suitable quantity of the substance is introduced into a boring 20' in the electrode 20 preferably before placing it in the carrier 17. The current source is connected to the terminals 27 with such polarity that the carbon electrodes 20 containing the substances to be analysed will be cathodes. By turning the revolving support one step at a time all the electrodes are in turn brought into position for exposure in front of the slit in the spectrograph. Preferably, the number of electrodes in the apparatus is so chosen that they are sufficient for exposing a whole spectrum plate. The arc between the pair of electrodes which are in position for exposure at a given moment may be drawn for example by short-circuiting the electrodes momentarily by means of a third carbon rod.

The invention is not to be considered limited to the form thereof here described and shown. On the contrary, the invention is capable of variation in several directions. The revolving support may thus be rotatable in a vertical plane instead of in the horizontal plane, if the spectrograph together with which the present apparatus is intended to be used is adapted in a manner suitable therefor. Furthermore, the revolving support may be replaced by a movable support of a different type, such as a bar slidable transversely in front of the slit of the spectrograph, the cathode and anode carbon carriers being mounted in pairs in a straight line, so that the pairs of carbons are moved serially past the slit. Instead of having all the electrode carriers mounted in pairs on the movable support, the cathode carbon carriers may alone be provided on said support, whether the latter is in the form of a revolving support or a slidable bar, while a stationary anode carbon carrier is mounted on the frame of the apparatus in such a manner that the anode carbon inserted therein is situated opposite a cathode carbon when the latter is in position in front of the slit. Further modifications in the construction of the elements of the apparatus are possible within the scope of the invention. It should be noted that the term "cathode carbon" has been used in the preceding specification as well as in the appendant claims to designate the carbon which contains the substance to be analysed in a boring, because the best result is obtained when using the cathode carbon for this purpose. However, it is not excluded to connect the carbons containing the substances to be analysed as anodes, although this may not give equally good results.

What we claim and desire to secure by Letters Patent is:

1. An apparatus for carrying out series of spectrum analyses, comprising a base, movable supporting means mounted on said base for adjustment to a number of predetermined positions, cathode carrier means mounted on said supporting means, a number of cathodes fixed in said cathode carrier means and containing substances to be analysed, anode carrier means, anodes fixed in said anode carrier means opposite said cathodes, and means for supplying an electric current to one pair of cathodes and anodes, to cause an arc between them when the supporting means is in predetermined positions.

2. An apparatus for carrying out series of spectrum analyses, comprising a base, movable supporting means mounted on said base for adjustment to a number of predetermined positions, cathode carrier means mounted on said supporting means, a number of cathodes fixed in said cathode carrier means and containing the substances to be analysed and movable with said supporting means to be brought in turn into position for exposure, anode carrier means also mounted on said supporting means, a number of anodes equal to that of the cathodes fixed in said anode carrier means opposite said cathodes and movable with said supporting means to be each brought in position for exposure together with the associated cathode, and means for supplying an electric current to one pair of cathodes and anodes at a time, when in position for exposure, to cause an arc between them.

3. An apparatus for carrying out series of spectrum analyses, comprising a base, movable supporting means mounted on said base for adjustment to a number of predetermined positions, cathode carrier means mounted on said supporting means, a number of cathodes fixed in said cathode carrier means and containing substances to be analysed and movable with said supporting means to be brought in turn into position for exposure, stationary anode carrier means, an anode fixed in said anode carrier means opposite a cathode being in position for exposure, and means for supplying an electric current to the pair of electrodes formed by said anode and cathode to cause an arc between them.

4. An apparatus for carrying out series of spectrum analyses, comprising a base, a revolving support mounted on said base and adjustable to a number of predetermined positions, cathode carrier means mounted on said revolving support, a number of cathodes fixed in said cathode carrier means and containing substances to be analysed, anode carrier means also mounted on said revolving support, a number of anodes equal to that of the cathodes fixed in said anode carrier means opposite said cathodes, said anodes and cathodes forming pairs of electrodes movable with the support to be brought in turn into position for exposure, and means for supplying an electric current to one pair of electrodes at a time, when in said position for exposure, to cause an arc between them.

5. An apparatus for carrying out series of spectrum analyses, comprising a base, a revolving support rotatably mounted on said base for movement to a number of predetermined positions, cathode carrier means mounted on said revolving support at the periphery thereof, a number of cathodes fixed in said cathode carrier means and spaced around the periphery of said revolving support, said cathodes having recesses to receive the substances to be analysed, anode carrier means also mounted on said revolving support at the periphery thereof, a number of anodes equal to that of the cathodes fixed in said anode carrier means opposite said cathodes, said anodes and cathodes forming pairs of electrodes, and means for supplying an electric current to one pair of electrodes at a time, to cause an arc between them when the support is at one of said predetermined positions.

6. An apparatus for carrying out series of spectrum analyses, comprising a base, a revolving support adjustable to a number of predetermined positions and composed of a sleeve member mounted on said base, two parallel spaced disk members rigidly but detachably secured on said sleeve member, cathode carrier means mounted on one of said disk members, a number of cathodes fixed in said cathode carrier means and containing substances to be analysed, anode carrier means mounted on the other of said disk members, a number of anodes equal to that of the cathodes fixed in said anode carrier means opposite said cathodes, said anodes and cathodes forming pairs of electrodes movable with said support to be brought in turn in position for exposure, and means for supplying an electric current to one pair of electrodes at a time, when in said position for exposure, to cause an arc between them.

7. An apparatus for carrying out series of spectrum analyses, comprising a base, a movable supporting means mounted on said base, resilient catch means to hold said supporting means in a number of predetermined positions, cathode carrier means mounted on said supporting means, a number of cathodes fixed in said cathode carrier means and containing substances to be analysed and movable with the supporting means to be brought in turn in position, for exposure, anode carrier means, anodes fixed in said anode carrier means opposite said cathodes, and means for supplying an electric current to one pair of cathodes and anodes at a time, when in position for exposure, to cause an arc between them.

8. An apparatus for carrying out series of spectrum analyses, comprising a base, a revolving support mounted on said base and adjustable to a number of predetermined positions, cathode carrier means mounted on said revolving support, a number of cathodes fixed in said cathode carrier means and containing substances to be analysed, anode carrier means also mounted on said revolving support, a number of anodes equal to that of the cathodes fixed in said anode carrier means opposite said cathodes, said anodes and cathodes forming pairs of electrodes movable with the support to be brought in turn in position for exposure, and contact means cooperating with said revolving support for supplying an electric current to one pair of electrodes at a time, when in said position for exposure, to cause an arc between them.

9. An apparatus for carrying out series of spectrum analyses, comprising a base, a revolving support adjustable to a number of predetermined positions and composed of a sleeve member mounted on said base, two parallel spaced disk members rigidly but detachably secured on said sleeve member, cathode carrier means mounted on one of said disk members, and anode carrier means mounted on the other of said disk members, separate auxiliary means for receiving either of said disk members in detached condition, and an abutment on said auxiliary means for fixing the position of cathode and anode carbons inserted in said cathode and anode carrier means respectively when the disk members are placed on said auxiliary means.

10. An apparatus for carrying out series of spectrum analyses, comprising a base, movable supporting means mounted on said base, means for releasably retaining said supporting means in successive stationary positions, electrode carrier means mounted on said supporting means, a number of electrodes fixed in a row in said electrode carrier means, and means for applying a voltage across an air gap formed by said electrodes in succession to cause an arc between them when the supporting means is in its successive stationary positions.

11. An apparatus for carrying out series of spectrum analyses, comprising a base, movable supporting means mounted on said base, electrode carrier means mounted on said supporting means, a number of electrodes fixed in a row in said electrode carrier means and having cavities therein for receiving materials to be analyzed, means for releasably retaining said supporting means in successive stationary positions to hold selected electrodes in stationary operative position, and means including contact mechanism for completing an electric circuit through electrodes in said operative position to apply a voltage across them and produce an arc.

NILS HERMAN BRUNDIN.
SVEN PALMQVIST.